(12) United States Patent
Kim (10) Patent No.: US 11,167,807 B2
(45) Date of Patent: Nov. 9, 2021

(54) CONNECTION STRUCTURE OF VEHICLE BODY

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/836,227

(22) Filed: Mar. 31, 2020

(65) Prior Publication Data
US 2021/0171123 A1    Jun. 10, 2021

(30) Foreign Application Priority Data
Dec. 9, 2019  (KR) .................. 10-2019-0162906

(51) Int. Cl.
| | |
|---|---|
| B62D 27/02 | (2006.01) |
| B62D 25/04 | (2006.01) |
| B62D 25/06 | (2006.01) |
| B62D 25/20 | (2006.01) |

(52) U.S. Cl.
CPC .......... B62D 27/023 (2013.01); B62D 25/04 (2013.01); B62D 25/06 (2013.01); *B62D 25/2036* (2013.01)

(58) Field of Classification Search
CPC ........ B62D 25/02; B62D 25/04; B62D 27/02; B62D 27/023; B62D 23/00; B62D 23/005
USPC ................... 296/205, 203.01, 203.04
See application file for complete search history.

(56) References Cited

U.S. PATENT DOCUMENTS

| | | | | |
|---|---|---|---|---|
| 4,660,345 A | * | 4/1987 | Browning | B62D 21/08 164/63 |
| 9,266,569 B1 | * | 2/2016 | Tew | B62D 25/06 |
| 10,150,179 B2 | * | 12/2018 | Hofer | B23K 20/1265 |
| 2010/0244497 A1 | * | 9/2010 | Honda | B62D 21/02 296/205 |

FOREIGN PATENT DOCUMENTS

KR    19970041274 A    7/1997

* cited by examiner

*Primary Examiner* — Dennis H Pedder
(74) *Attorney, Agent, or Firm* — Slater Matsil, LLP (57) ABSTRACT

A connection structure of a vehicle body includes a roof side rail member extending in a longitudinal direction of the vehicle body, a roof rear cross member extending in a transverse direction of the vehicle body, and having an end coupled to the roof side rail member, a rear pillar member extending in a vertical direction of the vehicle body, and having an upper portion coupled to the roof side rail member and aligned with the end of the roof rear cross member, wherein the upper portion of the rear pillar member and the roof side rail member are coupled to each other by an insertion protrusion and an insertion groove, and a cover bracket covering a portion where the roof side rail member, the roof rear cross member, and the rear pillar member are connected to each other.

20 Claims, 6 Drawing Sheets

CONNECTION STRUCTURE OF VEHICLE BODY

CROSS-REFERENCE TO RELATED APPLICATIONS

This application claims priority to Korean Patent Application No. 10-2019-0162906, filed on Dec. 9, 2019, which application is hereby incorporated herein by reference.

TECHNICAL FIELD

The present disclosure relates generally to a connection structure of a vehicle body.

BACKGROUND

In the case of a conventional monocoque-type vehicle body, multiple components are coupled to each other in a complex structure to construct a vehicle body. Shapes and coupling structures of the components are different for each vehicle model.

Therefore, in order to construct a vehicle body of one vehicle model, multiple molds are required for the manufacture of components for constructing the vehicle body. Furthermore, since the molds cannot be used in common to construct a vehicle body of another vehicle model, another group of molds should be manufactured.

As described above, in the case of manufacturing a vehicle body according to different assembly structures for each vehicle model and using a plurality of components, workability is decreased.

The foregoing is intended merely to aid in the understanding of the background of the present disclosure, and is not intended to mean that the present disclosure falls within the purview of the related art that is already known to those skilled in the art.

SUMMARY

The present disclosure relates generally to a connection structure of a vehicle body. Particular embodiments relate to a connection structure of an upper portion of a rear pillar (C pillar).

Accordingly, embodiments of the present disclosure provide a connection structure of a vehicle body, the connection structure being configured such that a component corresponding to a rear pillar (C pillar) of a vehicle may be easily assembled to a roof and a floor of the vehicle, and may be connected thereto with excellent strength and rigidity, when a modularized space frame vehicle body is constructed.

According to one embodiment of the present disclosure, there is provided a connection structure of a vehicle body. The connection structure includes a roof side rail member extending in a longitudinal direction of the vehicle body, a roof rear cross member extending in a transverse direction of the vehicle body, and having an end coupled to a rear end of the roof side rail member, a rear pillar member extending in a vertical direction of the vehicle body, and having an upper portion coupled to the rear end of the roof side rail member while being aligned with the end of the roof rear cross member, and a cover bracket covering a portion where the rear end of the roof side rail member, the end of the roof rear cross member, and the upper portion of the rear pillar member are connected to each other, the cover bracket to be integrated with the portion in a single body, wherein the rear end of the roof side rail member and the upper portion of the rear pillar member may be coupled to each other by being fastened in an inserting manner by an insertion protrusion and an insertion groove.

An upper end of the rear pillar member may be provided as a reinforcement part that may be bent along a longitudinal direction of the roof side rail member, and the reinforcement part and the rear end of the roof side rail member may be coupled to each other by being fastened in the inserting manner.

The rear end of the roof side rail member may be coupled with a protruding bracket that may protrude to face the rear pillar member, the insertion protrusion may be integrally provided with the protruding bracket, a groove bracket may be engaged with the reinforcement part to protrude to face the roof side rail member, and the groove bracket may be provided with the insertion groove, so that the insertion protrusion may be engaged with the insertion groove in the inserting manner.

The insertion protrusion and the insertion groove may be engaged with each other, as an upper end of the rear pillar member is moved in the transverse direction of the vehicle body toward the rear end of the roof side rail member, and the rear pillar member may be restricted from being moved in the vertical direction and the longitudinal direction of the vehicle body by the engagement between the insertion protrusion and the insertion groove.

The insertion protrusion may include a neck portion and a locking portion, the neck portion protruding from the protruding bracket toward the rear pillar member, and the locking portion being provided at an end of the neck portion and having a sectional width relatively larger than that of the neck portion. The insertion groove may have a depressed shape corresponding to outer lines of the neck portion and the locking portion of the insertion protrusion.

A plurality of insertion protrusions and a plurality of insertion grooves may be provided in an arrangement in which the insertion protrusions and the insertion grooves may be respectively spaced apart from each other in a front to rear direction that may be the longitudinal direction of the roof side rail member.

The cover bracket may include a first cover bracket provided at an inside of the vehicle body to integrally cover the rear end of the roof side rail member, the end of the roof rear cross member, and the upper portion of the rear pillar member, a second cover bracket provided at an outside of the vehicle body to integrally cover the rear end of the roof side rail member and the end of the roof rear cross member, and a third cover bracket provided at the outside of the vehicle body to integrally cover the rear end of the roof side rail member and the upper portion of the rear pillar member.

The second cover bracket and the third cover bracket may be coupled to each other without a gap remaining therebetween, as the second cover bracket and the third cover bracket are in contact with each other at the roof side rail member outside the vehicle body and are connected to each other in a flat surface-contact manner.

The first cover bracket and the third cover bracket may be disposed to be overlapped with each other, thus providing a flange part having a predetermined area. The flange part may be disposed at a portion between the rear end of the roof side rail member and the upper portion of the rear pillar member.

The flange part of the cover bracket may be provided to integrally cover the protruding bracket having the insertion protrusion and the groove bracket having the insertion groove, in addition to the reinforcement part of the rear pillar member.

According to an embodiment of the present disclosure, when a modularized space frame vehicle body is constructed, the upper portion of the rear pillar member corresponding to a rear pillar (C pillar) of a vehicle is coupled to the rear end of the roof side rail member in the inserting manner by the insertion protrusion and the insertion groove, so that the rear pillar member and the roof side rail member are connected to each other with an easy assembly process and with excellent strength and rigidity. Accordingly, the connection structure of embodiments of the present disclosure can secure stronger coupling force, strength, and rigidity, and be improved in durability.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Hereinbelow, a connection structure of a vehicle body according to an exemplary embodiment of the present disclosure will be described with reference to the accompanying drawings.

Figure 1:
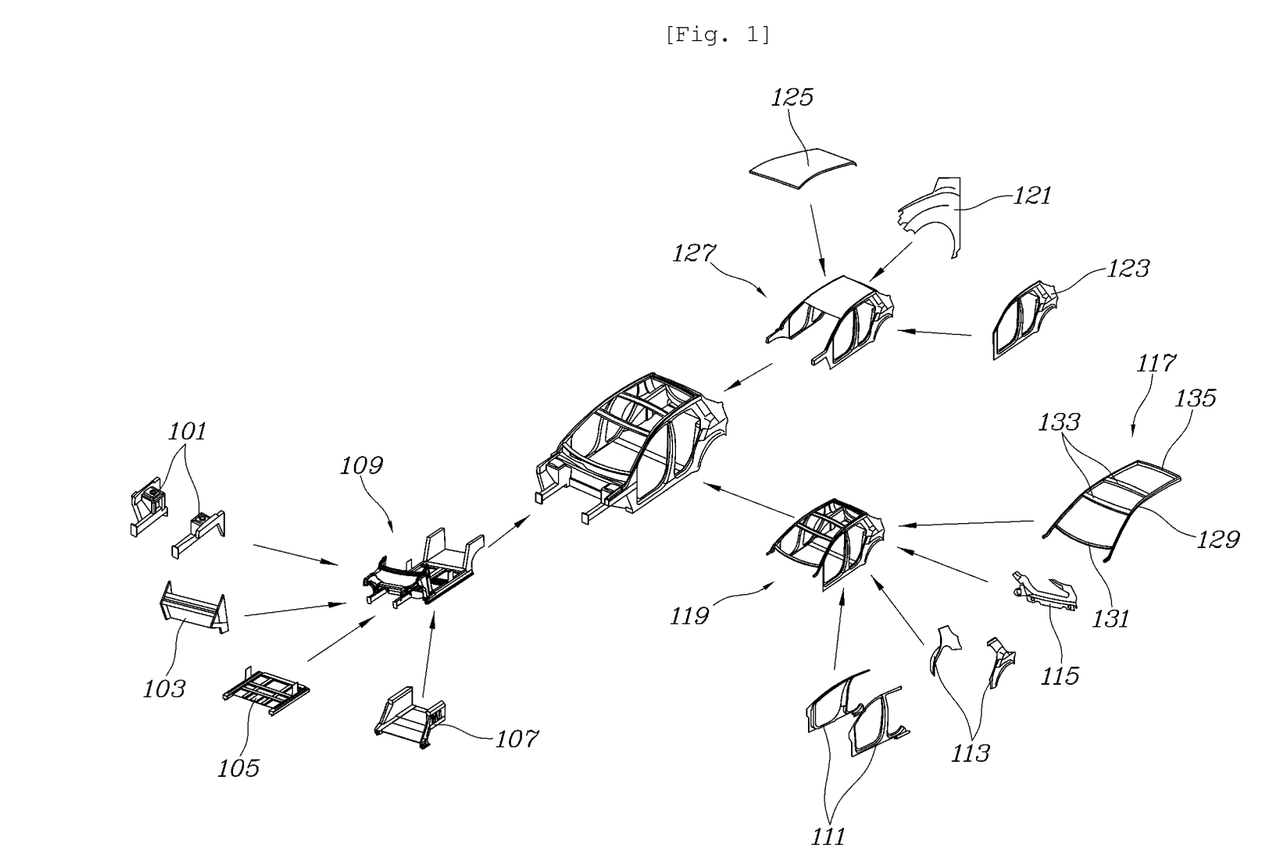
FIG. 1 is a view showing a modularized space frame vehicle body.

FIG. 1 is a view showing a modularized space frame vehicle body. Referring to FIG. 1, a floor assembly 109 includes a front apron assembly 101, a dash assembly 103, a center floor assembly 105, and a rear floor assembly 107. An upper assembly 119 includes a side assembly 11, a quarter assembly 113, a back assembly 115, and a roof carrier 117. When the floor assembly 109 and the upper assembly 119 are assembled, a skin assembly 127, including a fender 121, a side-outer 123, and a roof panel 125, is coupled thereto to construct the space frame vehicle body.

For reference, the above description of the drawing in FIG. 1 is only for easy understanding of the configuration of the space frame vehicle body mentioned in the present disclosure, and it does not represent an assembly order of compartments constituting an actual space frame vehicle body. The actual assembly order may vary depending on various situations.

The roof carrier 117 includes roof side tubes 129, a cowl 131, middle roof rails 133, and a rear roof rail 135 that form a space frame structure. The roof side tubes 129 are at opposite sides of a vehicle, and the cowl 131, the middle roof rails 133, and the rear roof rail 135, which are provided between the roof side tubes 129 to connect the roof side tubes 129 to each other, are formed in a hollow closed tube structure. As the roof side tubes 129 are expanded and contracted in a longitudinal direction of a vehicle body, and the cowl 131, the middle roof rails 133, and the rear roof rail 135 are expanded and contracted in a transverse direction of the vehicle body, the roof carrier 117 may be easily transformed and applied to various vehicle types and various vehicle models.

The front apron assembly 101, the dash assembly 103, the center floor assembly 105, and the rear floor assembly 107, which are modularized so as to form the floor assembly 109, are assembled by varying lengths or widths thereof. Thus, the floor assembly 109 is easily transformed and applied to various vehicle types and various vehicle models.

As the roof carrier 117 and the floor assembly 109 are transformed, other components may be assembled by adjusting shapes or sizes thereof. Accordingly, it is easy to develop a vehicle body suitable for a new type or model of a vehicle, so that the development of the new vehicle type may be easy, and the vehicle body structure may be effectively applied to small quantity batch production.

Meanwhile, the skin assembly 127 including the fender 121, the side-outer 123, and the roof panel 125 may be made of various materials such as carbon fiber reinforced plastics (CFRP) as well as conventional steel plastics. Thus, each shape of the components may be freely transformed depending on vehicle types or vehicle models so as to be applied to the above-described space frame, and various vehicles may be easily manufactured.

Figure 2:
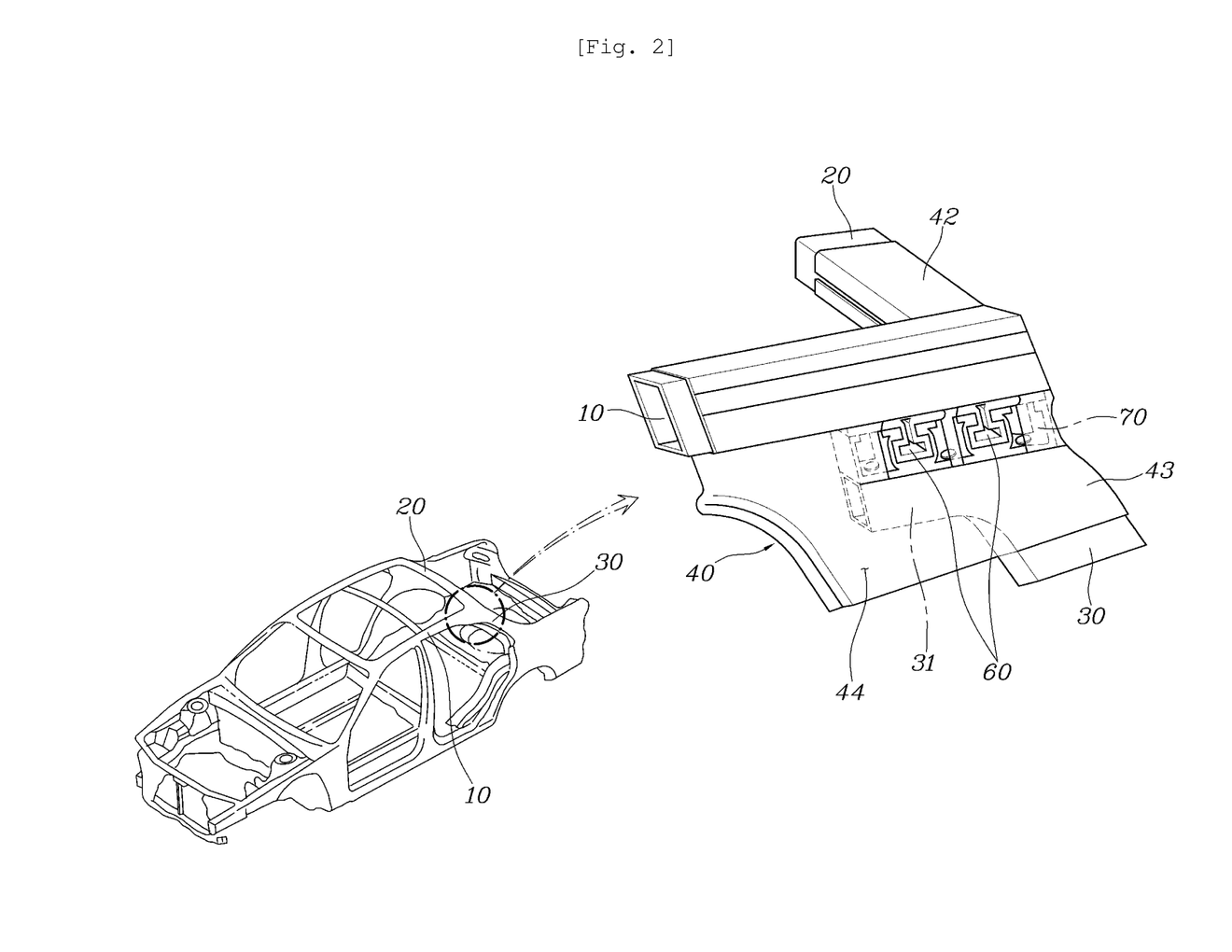
FIG. 2 is a view showing a connection structure of a vehicle body according to an embodiment of the present disclosure, wherein a roof side rail member and a rear pillar member are coupled to each other in an inserting manner.
Figure 3:
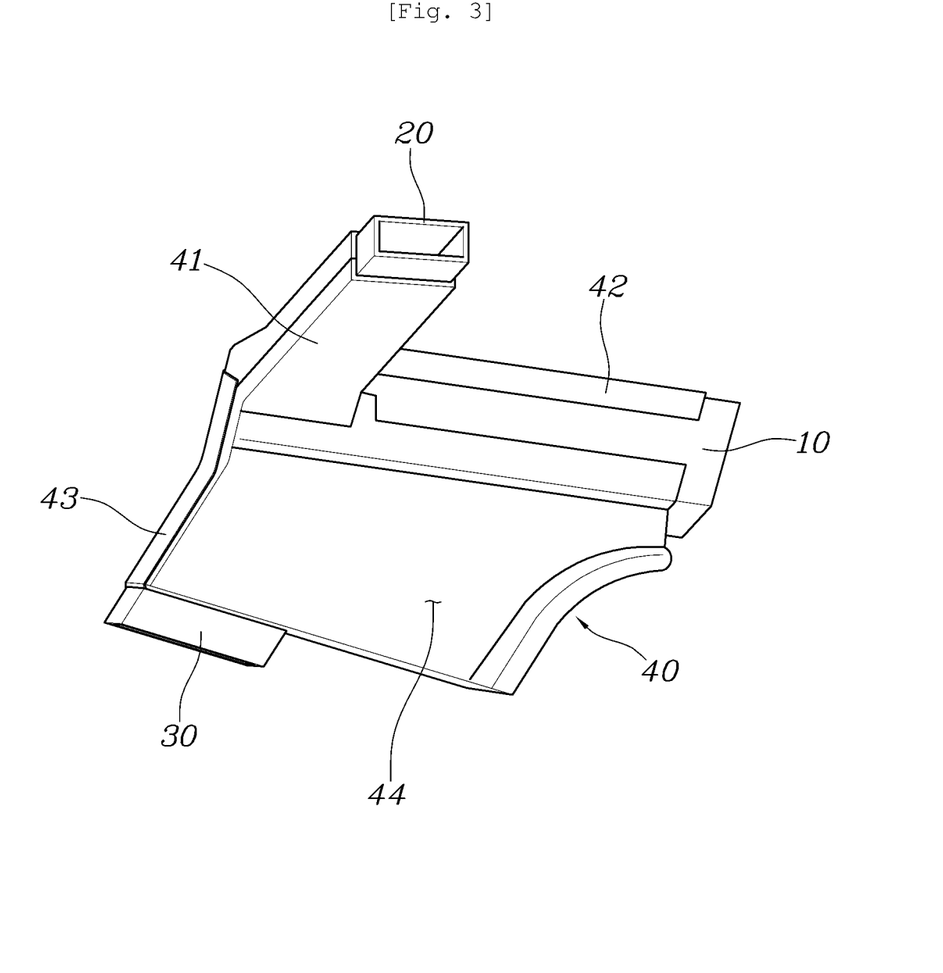
FIG. 3 is a bottom perspective view of FIG. 2.
Figure 4:
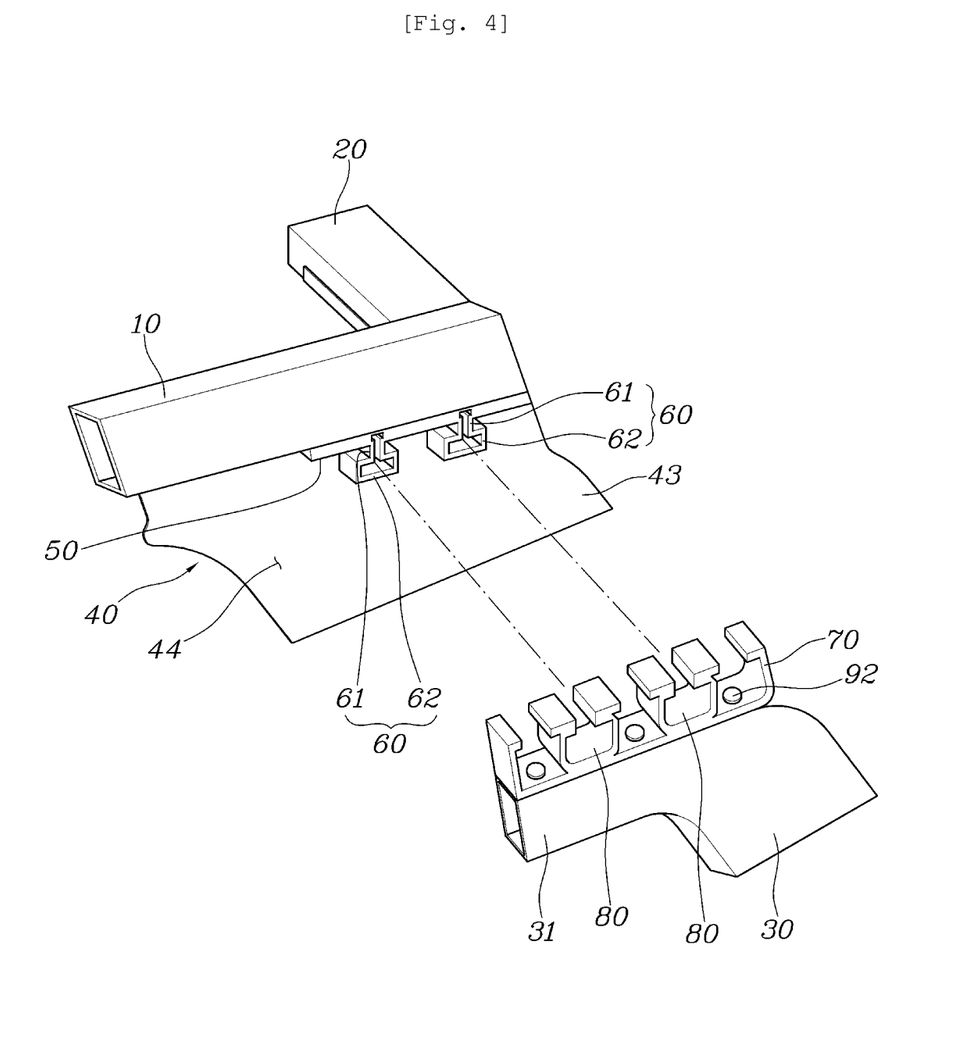
FIG. 4 is an exploded perspective view showing a roof side rail member having an insertion protrusion and a rear pillar member having an insertion groove according to embodiments of the present disclosure.
Figure 5:
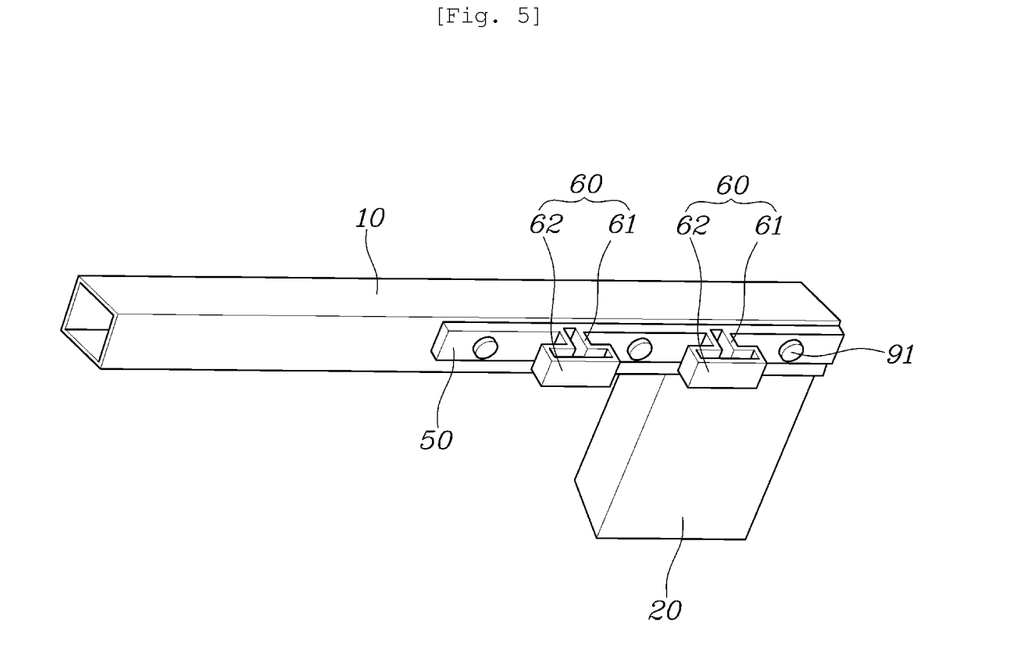
FIG. 5 is a bottom perspective view showing the roof side rail member to which a protruding bracket having the insertion protrusion of FIG. 4 is coupled.

The connection structure for a vehicle body may be configured to be applied to the space frame vehicle body that has the above-described configuration. As shown in the embodiment of FIGS. 2 and 3, the connection structure for a vehicle body includes a roof side rail member 10 extending in a longitudinal direction of a vehicle body, a roof rear cross member 20 extending in a transverse direction of the vehicle body and having an end coupled to a rear end of the roof side rail member 10, a rear pillar member 30 extending in a vertical direction of the vehicle body and having an upper portion coupled to the rear end of the roof side rail member 10 while being aligned with the end of the roof rear cross member 20, and a cover bracket 40 formed in a plate, and covering a portion where the rear end of the roof side rail member 10, the end of the roof rear cross member 20, and the upper portion of the rear pillar member 30 are connected to each other, the cover bracket 40 to be integrated with the portion in a single body. The rear end of the roof side rail member 10 and the upper portion of the rear pillar member 30 are coupled to each other in an inserting manner by an insertion protrusion 60 and an insertion groove 80.

That is, the roof side rail member 10 is interposed between the roof rear cross member 20 and the rear pillar member 30, and the roof rear cross member 20 and the rear pillar member 30 are connected at right angles to the roof side rail member 10, respectively. Further, the cover bracket 40 covers and reinforces the portion where the rear end of the roof side rail member 10, the end of the roof rear cross member 20, and the upper portion of the rear pillar member 30 are connected to each other, thereby constructing the connection structure of a vehicle body.

The roof side rail member 10, the roof rear cross member 20, and the rear pillar member 30 may all be formed as hollow tubes or pipes to construct the space frame structure.

In FIG. 1, the roof side rail member 10 may be a configuration corresponding to the roof side tubes 129, and the roof rear cross member 20 may be a configuration corresponding to the rear roof rail 135.

Further, the rear pillar member 30 may correspond to a component called a C pillar or a rear pillar of a general vehicle.

As shown in FIG. 1, the rear pillar member 30 may be aligned and connected to a portion at a rear end of the roof side tubes 129, e.g., the portion to which the rear roof rail 135 is connected, and the cover bracket 40 may be coupled to the space frame structure to cover a connected portion where the above-mentioned three components are connected to each other.

In addition, the connection structure of a vehicle body may be used such that the rear pillar member 30 is coupled to an object such as the floor assembly 109 in FIG. 1.

That is, the connection structure may correspond to a structure in which a lower end of the rear pillar member 30 is coupled to a rear end of a side sill that is positioned at the side of the floor assembly 109.

The floor assembly 109 as described above may be provided with a cross member that is different from the above-mentioned component and formed in the transverse direction of the vehicle body. Accordingly, by corresponding the cross member provided in the floor assembly 109 to the rear roof rail 135 provided in the roof carrier 117 in FIG. 1, the connection structure of a vehicle body in FIG. 2 may be used as the same structure in which the rear pillar member 30 is coupled to the rear end of the side sill of the floor assembly 109, while only a direction of the connection structure is changed up and down.

Practically, embodiments of the present disclosure are expressed with the concept including both when the rear pillar member 30 is coupled to the rear end of the roof side tubes 129 and when coupled to the rear end of the side sill of the floor assembly 109, as described above. That is, the connection structure of a vehicle body of the present disclosure may be commonly used in structures in which the rear pillar member 30 formed in the vertical direction of the vehicle body is coupled to both an upper side and a lower side of the vehicle body.

According to an embodiment of the present disclosure, the roof rear cross member 20 is disposed in the transverse direction of the vehicle body perpendicular to the roof side rail member 10. The end of the roof rear cross member 20 is connected to the roof side rail member 10 in a manner of being directly coupled to the rear end of the roof side rail member 10.

Coupling between the roof rear cross member 20 and the roof side rail member 10 may be performed by welding, structural adhesives, or separate coupling members.

As the end of the roof rear cross member 20 and the rear end of the roof side rail member 10 are directly coupled to each other, a coupled portion between the roof rear cross member 20 and the roof side rail member 10 may provide sufficient strength and rigidity.

According to an embodiment of the present disclosure, the rear pillar member 30 is disposed at a right angle with respect to the roof side rail member 10 in the vertical direction of the vehicle body. The upper portion of the rear pillar member 30 may be coupled to the rear end of the roof side rail member 10 in a form in which the upper portion of the rear pillar member 30 is aligned with the end of the roof rear cross member 20.

As described above, the rear end of the roof side rail member 10 and the end of the roof rear cross member 20 may be coupled to each other by welding, and the rear end of the roof side rail member 10 and the upper portion of the rear pillar member 30 may be coupled to each other by welding. However, in an embodiment of the present disclosure, coupling between the rear end of the roof side rail member 10 and the upper portion of the rear pillar member 30 is performed in an inserting manner by the insertion protrusion 60 and the insertion groove 80 rather than welding.

That is, as shown in FIGS. 2 to 5, an upper end of the rear pillar member 30 is bent along a longitudinal direction of the roof side rail member 10 to provide a reinforcement part 31. The reinforcement part 31 and the rear end of the roof side rail member 10 are coupled to each other by being fastened in the inserting manner.

As the upper end of the rear pillar member 30 is bent in an L shape along the longitudinal direction of the roof side rail member 10 to form the reinforcement part 31, a coupled portion between the upper portion of the rear pillar member 30 and the rear end of the roof side rail member 10 may provide sufficient strength and rigidity.

The coupling structure between the insertion protrusion 60 and the insertion groove 80 will be described in detail. A protruding bracket 50 is coupled to the rear end of the roof side rail member 10 to protrude toward the rear pillar member 30, and the insertion protrusion 60 is integrally provided with the protruding bracket 50. Further, a groove bracket 70 is coupled to the reinforcement part 31 of the rear pillar member 30 to protrude toward the roof side rail member 10, and the insertion groove 80 is provided in the groove bracket 70, so that the insertion protrusion 60 is inserted into the insertion groove 80.

Of course, it is possible to apply a structure in which the insertion protrusion 60 and the insertion groove 80 are engaged with each other as a configuration opposite to the above-described embodiment of the present disclosure, when the protruding bracket 50 provided with the insertion protrusion 60 is provided at the upper end of the rear pillar member 30, and the groove bracket 70 provided with the insertion groove 80 is provided at the rear end of the roof side rail member 10.

The insertion protrusion 60 and the insertion groove 80 are engaged with each other in the insertion manner, as the upper end of the rear pillar member 30 is moved in the transverse direction of the vehicle body toward the rear end of the roof side rail member 10. Further, the rear pillar member 30 is restricted from being moved in the vertical direction and the longitudinal direction of the vehicle body by the engagement between the insertion protrusion 60 and the insertion groove 80.

The insertion protrusion 60 of an embodiment of the present disclosure includes a neck portion 61 protruding from the protruding bracket 50 toward the rear pillar member 30, and a locking portion 62 being provided at an end of the neck portion 61 and having a sectional width relatively larger than that of the neck portion 61.

The neck portion 61 has a shape in which two sections face each other while being overlapped, and has a relatively narrower sectional width than that of the locking portion 62. The locking portion 62 has a rectangular sectional shape extending from the neck portion 61, and has a relatively larger sectional width than that of the neck portion 61.

The insertion groove 80 has a shape corresponding to outer lines of the neck portion 61 and the locking portion 62, and is formed in a depressed shape on the groove bracket 70.

Accordingly, in order to couple the upper portion of the rear pillar member 30 to the rear end of the roof side rail member 10, the protruding bracket 50 is first coupled to a lower surface of the rear end of the roof side rail member 10 by using a coupling member 91 such as a bolt or a screw or structural adhesives. Next, the groove bracket 70 is coupled to an upper surface of the reinforcement part 31 of the rear pillar member 30 by using a coupling member 92 such as a bolt or a screw or structural adhesives. Then, when the groove bracket 70 of the rear pillar member 30 is moved in the transverse direction of the vehicle body toward the protruding bracket 50 of the roof side rail member 10, the insertion protrusion 60 and the insertion groove 80 are engaged with each other in the inserting manner.

As described above, when the upper end of the rear pillar member 30 and the rear end of the roof side rail member 10 are coupled to each other by the insertion protrusion 60 and the insertion groove 80, the rear pillar member 30 is brought into a restricted state in which the rear pillar member 30 cannot be moved in the vertical direction and the longitudinal direction of the vehicle body with respect to the roof side rail member 10. In this state, the cover bracket 40 is used to cover a coupled portion between the insertion protrusion 60 and the insertion groove 80, the portion including the reinforcement part 31, and then welding is performed or structural adhesives or a coupling member such as a bolt or a screw is used in the coupled portion to fix the insertion protrusion 60 and the insertion groove 80.

According to an embodiment of the present disclosure, a plurality of insertion protrusions 60 and a plurality of insertion grooves 80 are provided in an arrangement in which the insertion protrusions 60 and the insertion grooves 80 are respectively spaced apart from each other in a front to rear direction, that is, the longitudinal direction of the roof side rail member 10. Thus, the roof side rail member 10 and the rear pillar member 30 may have a stronger coupling force, and may be improved in strength, rigidity, and durability.

The cover bracket 40 of an embodiment of the present disclosure includes a first cover bracket 41 provided at an inside of the vehicle body to integrally cover the rear end of the roof side rail member 10, the end of the roof rear cross member 20, and the upper portion of the rear pillar member 30, a second cover bracket 42 provided at an outside of the vehicle body to integrally cover the rear end of the roof side rail member 10 and the end of the roof rear cross member 20, and a third cover bracket 43 provided at the outside of the vehicle body to integrally cover the rear end of the roof side rail member 10 and the upper portion of the rear pillar member 30.

That is, the first cover bracket 41, the second cover bracket 42, and the third cover bracket 43 provide support by covering connected portions between the rear end of the roof side rail member 10, the end of the roof rear cross member 20, and the upper portion of the rear pillar member 30 at all directions in a surface-contact manner. Thus, the connected portions may secure sufficient strength and rigidity.

An outer edge of the second cover bracket 42 and an outer edge of the third cover bracket 43 are in contact with each other at the roof side rail member 10 outside the vehicle body, and connected to each other in a flat surface-contact manner. The second cover bracket 42 and the third cover bracket 43 are coupled to each other without a gap remaining therebetween. Accordingly, the second cover bracket 42 and the third cover bracket 43 may have a stronger coupling force.

The first cover bracket 41, the second cover bracket 42, and the third cover bracket 43 that form the cover bracket 40 may be coupled to the connection structure by being fixed by welding, structural adhesives, or a coupling member such as a bolt or a screw, when the first cover bracket 41, the second cover bracket 42, and the third cover bracket 43 cover the connected portions where the end of the roof rear cross member 20, the upper portion of the rear pillar member 30, and the rear end of the roof side rail member 10 are coupled to each other.

The first cover bracket 41 and the third cover bracket 43 are disposed to be overlapped with each other, thus providing a flange part 44 that has a predetermined area. The flange part 44 is configured to be disposed at a portion between the rear end of the roof side rail member 10 and the upper portion of the rear pillar member 30. Accordingly, the connected portion between the rear end of the roof side rail member 10 and the upper portion of the rear pillar member 30 may have improved strength and rigidity.

Further, the flange part 44 is provided to integrally cover the protruding bracket 50 provided with the insertion protrusion 60 and the groove bracket 70 provided with the insertion groove 80, in addition to the reinforcement part 31 that is bent along the longitudinal direction of the roof side rail member 10 at the upper end of the rear pillar member 30. Thus, the inserting portion between the rear pillar member 30 and the roof side rail member 10 may provide sufficient strength and rigidity.

The connection structure of a vehicle body of embodiments of the present disclosure as described above is configured such that the length of the rear pillar member 30 may easily vary and be coupled to the rear end of the roof side rail member 10. Therefore, the connection structure of embodiments of the present disclosure may be easily applied to various structures of a vehicle body frame, as shown in FIGS. 6A-6C.

Figure 6A:
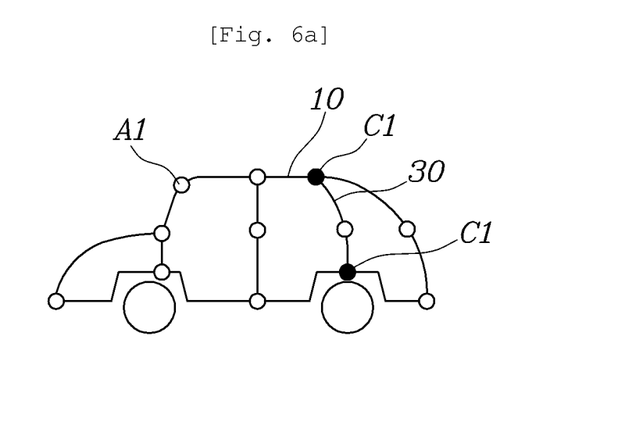
FIGS. 6A-6C show embodiments in which the connection structure of a vehicle body is applied to various vehicle body structures.
Figure 6B:
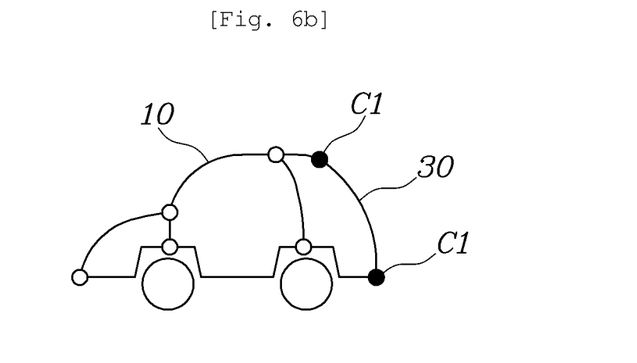
Figure 6C:
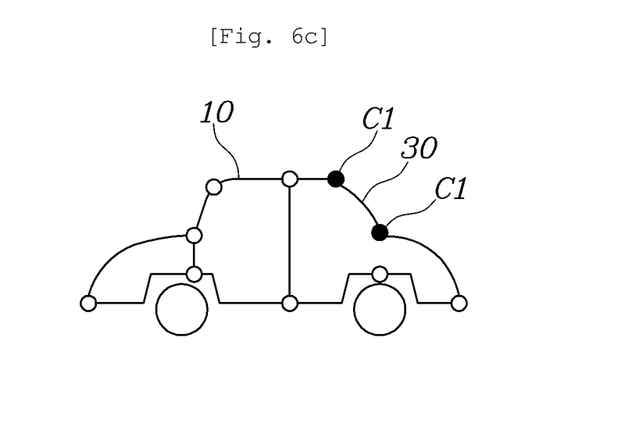

In FIGS. 6A-6C, various structures of a vehicle body frame are shown to be comparable to each other. In each structure of a vehicle body frame, circles A1 and C1 indicate joints provided to form each vehicle body frame. Among the circles, opposite ends of a component corresponding to the rear pillar member 30 of the present disclosure are indicated with solid circles C1, and the above-described connection structure of a vehicle body of the present disclosure may be applied to the solid circles C1.

That is, the connection structure of a vehicle body may be easily applied in common to the various vehicle types as shown in FIGS. 6A-6C, when the length variation of the rear pillar member 30 and the slight deformation are entailed. Accordingly, the development of new vehicle types may be carried out easily, and it is possible to provide technology infrastructure that may be effectively applied to small quantity batch production.

Hereinbefore, according to an embodiment of the present disclosure, in configuring a vehicle body structure of a modularized space frame type, the upper portion of the rear pillar member 30 that corresponds to a rear pillar (C pillar) of a vehicle is coupled to the rear end of the roof side rail member 10 in the inserting manner by the insertion protrusion 60 and the insertion groove 80, so that the connection between the rear pillar member 30 and the roof side rail member 10 is performed with easy assembly performance and excellent strength and rigidity. Accordingly, the connection structure can secure stronger coupling force, strength, and rigidity, and be improved in durability.

Although preferred embodiments of the present disclosure have been described for illustrative purposes, those skilled in the art will appreciate that various modifications, additions and substitutions are possible, without departing from the scope and spirit of the invention as disclosed in the accompanying claims.

What is claimed is:

1. A connection structure of a vehicle body, the connection structure comprising:

a roof side rail member extending in a longitudinal direction of the vehicle body;
a roof rear cross member extending in a transverse direction of the vehicle body and having an end coupled to a rear end of the roof side rail member;
a rear pillar member extending in a vertical direction of the vehicle body and having an upper portion coupled to the rear end of the roof side rail member and aligned with the end of the roof rear cross member, wherein the upper portion of the rear pillar member and the rear end of the roof side rail member are coupled to each other by an insertion protrusion and an insertion groove; and
a cover bracket covering a portion where the rear end of the roof side rail member, the end of the roof rear cross member, and the upper portion of the rear pillar member are connected to each other, the cover bracket configured to be integrated with the portion in a single body;
wherein the upper portion of the rear pillar member includes a reinforcement part, wherein the reinforcement part is bent along a longitudinal direction of the roof side rail member; and
wherein the reinforcement part and the rear end of the roof side rail member are coupled to each other by the insertion protrusion and the insertion groove.

2. The connection structure of claim 1, further comprising:
a protruding bracket coupled to the rear end of the roof side rail member, wherein the protruding bracket protrudes to face the rear pillar member, and wherein the insertion protrusion is integrally provided with the protruding bracket; and
a groove bracket engaged with the reinforcement part to protrude to face the roof side rail member, wherein the groove bracket is provided with the insertion groove, so that the insertion protrusion is engaged with the insertion groove.

3. The connection structure of claim 2, wherein:
the insertion protrusion comprises a neck portion and a locking portion, the neck portion protrudes from the protruding bracket toward the rear pillar member, and the locking portion is provided at an end of the neck portion and has a sectional width relatively larger than that of the neck portion; and
the insertion groove has a depressed shape corresponding to outer lines of the neck portion and the locking portion of the insertion protrusion.

4. The connection structure of claim 2, wherein a plurality of insertion protrusions and a plurality of insertion grooves are provided in an arrangement in which the insertion protrusions and the insertion grooves are respectively spaced apart from each other in a front to rear direction, wherein the front to rear direction is the longitudinal direction of the roof side rail member.

5. The connection structure of claim 2, wherein the cover bracket comprises:
a first cover bracket provided at an inside of the vehicle body to integrally cover the rear end of the roof side rail member, the end of the roof rear cross member, and the upper portion of the rear pillar member;
a second cover bracket provided at an outside of the vehicle body to integrally cover the rear end of the roof side rail member and the end of the roof rear cross member; and
a third cover bracket provided at the outside of the vehicle body to integrally cover the rear end of the roof side rail member and the upper portion of the rear pillar member.

6. The connection structure of claim 5, wherein the second cover bracket and the third cover bracket are coupled to each other without a gap between them.

7. The connection structure of claim 6, wherein the second cover bracket and the third cover bracket are in contact with each other at the roof side rail member outside the vehicle body and are connected to each other in a flat surface-contact manner.

8. The connection structure of claim 5, wherein:
the first cover bracket and the third cover bracket are disposed to be overlapped with each other to provide a flange part having a predetermined area; and
the flange part is disposed at a region between the rear end of the roof side rail member and the upper portion of the rear pillar member.

9. The connection structure of claim 8, wherein the flange part of the cover bracket is provided to integrally cover the protruding bracket having the insertion protrusion and the groove bracket having the insertion groove, in addition to the reinforcement part of the rear pillar member.

10. The connection structure of claim 1, wherein:
the insertion protrusion and the insertion groove are configured to engage with each other as an upper end of the rear pillar member is moved in the transverse direction of the vehicle body toward the rear end of the roof side rail member; and
the rear pillar member is configured to be restricted from being moved in the vertical direction and the longitudinal direction of the vehicle body by engagement between the insertion protrusion and the insertion groove.

11. A vehicle comprising:
a vehicle body;
a roof side rail member extending in a longitudinal direction of the vehicle body, the roof side rail member having a rear end;
a roof rear cross member extending in a transverse direction of the vehicle body, the roof rear cross member having an end coupled to the rear end of the roof side rail member;
a rear pillar member extending in a vertical direction of the vehicle body, the rear pillar member aligned with the end of the roof rear cross member and having an upper portion coupled to the rear end of the roof side rail member by an insertion protrusion engaged with an insertion groove; and
a cover bracket covering a portion where the rear end of the roof side rail member, the end of the roof rear cross member, and the upper portion of the rear pillar member are connected to each other;
wherein the upper portion of the rear pillar member includes a reinforcement part, wherein the reinforcement part is bent along a longitudinal direction of the roof side rail member; and
wherein the reinforcement part and the rear end of the roof side rail member are coupled to each other by the insertion protrusion and the insertion groove.

12. The vehicle of claim 11, further comprising:
a protruding bracket coupled to the rear end of the roof side rail member, wherein the protruding bracket protrudes to face the rear pillar member, and wherein the protruding bracket comprises an insertion protrusion; and a groove bracket engaged with the upper portion of the rear pillar member to protrude to face the roof side rail member, wherein the groove bracket comprises an insertion groove.

13. The vehicle of claim 12, wherein:
the insertion protrusion comprises a neck portion and a locking portion, the neck portion protrudes from the protruding bracket toward the rear pillar member, and the locking portion is provided at an end of the neck portion and has a sectional width relatively larger than that of the neck portion; and
the insertion groove has a depressed shape corresponding to outer lines of the neck portion and the locking portion of the insertion protrusion.

14. The vehicle of claim 12, further comprising a plurality of insertion protrusions and a plurality of insertion grooves, wherein the insertion protrusions and the insertion grooves are respectively spaced apart from each other in a front to rear direction, wherein the front to rear direction is the longitudinal direction of the roof side rail member.

15. The vehicle of claim 11, wherein the cover bracket comprises:
a first cover bracket provided at an inside of the vehicle body to integrally cover the rear end of the roof side rail member, the end of the roof rear cross member, and the upper portion of the rear pillar member;
a second cover bracket provided at an outside of the vehicle body to integrally cover the rear end of the roof side rail member and the end of the roof rear cross member; and
a third cover bracket provided at the outside of the vehicle body to integrally cover the rear end of the roof side rail member and the upper portion of the rear pillar member.

16. The vehicle of claim 11, wherein the vehicle body further comprises:
a floor assembly having a side portion coupled to a lower end of the rear pillar member; and
an upper assembly coupled to the floor assembly.

17. The vehicle of claim 16, wherein the vehicle body further comprises a skin assembly coupled to the floor assembly and the upper assembly.

18. A vehicle comprising:
a vehicle body;
a roof side rail member extending in a longitudinal direction of the vehicle body, the roof side rail member having a rear end;
a roof rear cross member extending in a transverse direction of the vehicle body, the roof rear cross member having an end coupled to the rear end of the roof side rail member;
a rear pillar member extending in a vertical direction of the vehicle body, the rear pillar member aligned with the end of the roof rear cross member and having an upper portion coupled to the rear end of the roof side rail member by an insertion protrusion engaged with an insertion groove;
a cover bracket covering a portion where the rear end of the roof side rail member, the end of the roof rear cross member, and the upper portion of the rear pillar member are connected to each other;
a protruding bracket coupled to the rear end of the roof side rail member, wherein the protruding bracket protrudes to face the rear pillar member, and wherein the protruding bracket comprises an insertion protrusion; and
a groove bracket engaged with the upper portion of the rear pillar member to protrude to face the roof side rail member, wherein the groove bracket comprises an insertion groove.

19. The vehicle of claim 18, wherein:
the insertion protrusion comprises a neck portion and a locking portion, the neck portion protrudes from the protruding bracket toward the rear pillar member, and the locking portion is provided at an end of the neck portion and has a sectional width relatively larger than that of the neck portion; and
the insertion groove has a depressed shape corresponding to outer lines of the neck portion and the locking portion of the insertion protrusion.

20. The vehicle of claim 18, further comprising a plurality of insertion protrusions and a plurality of insertion grooves, wherein the insertion protrusions and the insertion grooves are respectively spaced apart from each other in a front to rear direction, wherein the front to rear direction is the longitudinal direction of the roof side rail member.

* * * * *